US012682881B2

(12) United States Patent
Yuzuriha

(10) Patent No.: US 12,682,881 B2
(45) Date of Patent: Jul. 14, 2026

(54) INTERFERENCE SOUND SUPPRESSING DEVICE, INTERFERENCE SOUND SUPPRESSING METHOD, AND NON-TRANSITORY COMPUTER READABLE RECORDING MEDIUM STORING INTERFERENCE SOUND SUPPRESSING PROGRAM

(71) Applicant: Panasonic Intellectual Property Corporation of America, Torrance, CA (US)

(72) Inventor: Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 141 days.

(21) Appl. No.: 18/894,228

(22) Filed: Sep. 24, 2024

(65) Prior Publication Data

US 2025/0014560 A1 Jan. 9, 2025

Related U.S. Application Data

(63) Continuation of application No. PCT/JP2022/048517, filed on Dec. 28, 2022.

(30) Foreign Application Priority Data

Mar. 29, 2022 (JP) ................................ 2022-054292

(51) Int. Cl.
*G10K 11/178* (2006.01)

(52) U.S. Cl.
CPC .. *G10K 11/17823* (2018.01); *G10K 11/17873* (2018.01); *G10K 2210/3027* (2013.01);
(Continued)

(58) Field of Classification Search
CPC ....... G10K 11/17823; G10K 11/17873; G10K 2210/3027; G10K 2210/3051;
(Continued)

(56) References Cited

U.S. PATENT DOCUMENTS 7,889,874 B1 * 2/2011 Ayad ...................... G10K 11/00 381/94.1
8,243,941 B2 * 8/2012 Togawa ............ H03H 21/0012 381/71.1
(Continued)

FOREIGN PATENT DOCUMENTS

JP 4253232 4/2009
JP 4478045 6/2010

OTHER PUBLICATIONS

International Search Report issued Mar. 20, 2023 in corresponding International Application No. PCT/JP2022/048517.
(Continued)

*Primary Examiner* — Yosef K Laekemariam
(74) *Attorney, Agent, or Firm* — Wenderoth, Lind & Ponack, L.L.P.

(57) ABSTRACT

An interference sound suppressing device includes: an input signal acquiring part that acquires an input signal obtained from a microphone; a reference signal acquiring part that acquires a reference signal; a data inserting part that increases an amount of data of the input signal to be larger than an amount of data of the reference signal by inserting a plurality of zeros into the input signal; an interference sound suppressing part that suppresses an interference sound component included in the input signal by using the input signal having the amount of data increased and the reference signal; a data deleting part that restores the amount of data of the input signal to an original amount by deleting the plurality of zeros inserted from the input signal in which the
(Continued)

interference sound component is suppressed; and an output part that outputs the input signal having the amount of data restored.

9 Claims, 5 Drawing Sheets

(52) U.S. Cl.
CPC ................ *G10K 2210/3051* (2013.01); *G10K 2210/505* (2013.01)

(58) Field of Classification Search
CPC ........... G10K 2210/505; G10K 11/178; H04M 9/082; H04R 3/005
USPC ............................................ 381/66, 93, 94.1
See application file for complete search history.

(56) References Cited

U.S. PATENT DOCUMENTS 9,916,840 B1 * 3/2018 Do ........................ H04M 9/082
2010/0215185 A1 * 8/2010 Christoph ............. H04M 9/082 381/71.1

OTHER PUBLICATIONS

Extended European Search Report issued May 27, 2025 in European Patent Application No. 22935786.8.

* cited by examiner

INTERFERENCE SOUND SUPPRESSING DEVICE, INTERFERENCE SOUND SUPPRESSING METHOD, AND NON-TRANSITORY COMPUTER READABLE RECORDING MEDIUM STORING INTERFERENCE SOUND SUPPRESSING PROGRAM

FIELD OF INVENTION

The present disclosure relates to a technique for suppressing an interference sound included in an input signal obtained from a microphone.

BACKGROUND ART

For example, a noise suppressing device disclosed in Patent Literature 1 stores an input signal by a predetermined number N of samples each time, generates a conversion frame for converting an input signal into a frequency domain coefficient every time the latest number of samples among stored samples reaches a predetermined number M (<N) of samples, and converts each piece of sample data of the conversion frame into a frequency domain. Then, when converting the data into a frequency domain, the noise suppressing device executes only calculation processing related to the updated M samples, and copies and uses a calculation result of a previous frame for another piece of data. Then, the noise suppressing device suppresses a noise signal from the input signal in the frequency domain, converts a noise-suppressed signal in which the noise signal is suppressed into a time domain, generates an addition frame for generating an output signal, and generates an output signal by superimposing and adding M samples of the addition frame and M samples of an addition frame one frame before the addition frame.

Further, for example, an echo cancellation device disclosed in Patent Literature 2 analyzes a frequency component of the sum of reproduction signals and a frequency component of a collected sound signal, groups the frequency components, and estimates an amplitude spectrum of an echo of the group from an amplitude ratio for each group. Then, the echo cancellation device calculates a frequency component of an echo cancellation signal from an amplitude ratio for each frequency component of a collected sound signal and an estimated echo amplitude spectrum, converts the frequency component of the echo cancellation signal into a time domain, and outputs the signal.

However, in the above-described conventional technique, it is difficult to achieve both improvement in call quality and reduction in calculation amount, and further improvement has been required.

Patent Literature 1: JP 4253232 B2

Patent Literature 2: JP 4478045 B2

SUMMARY OF THE INVENTION

The present disclosure has been made to solve the above problem, and an object of the present disclosure is to provide a technique capable of improving call quality and reducing an amount of calculation.

An interference sound suppressing device according to the present disclosure includes an input signal acquiring part that acquires an input signal obtained from a microphone, a reference signal acquiring part that acquires a reference signal, a data inserting part that increases an amount of data of the input signal to be larger than an amount of data of the reference signal by inserting a plurality of zeros into the input signal acquired, an interference sound suppressing part that suppresses an interference sound component included in the input signal by using the input signal having the amount of data increased and the reference signal acquired, a data deleting part that restores the amount of data of the input signal to an original amount by deleting the plurality of zeros inserted from the input signal in which the interference sound component is suppressed, and an output part that outputs the input signal having the amount of data restored.

According to the present disclosure, it is possible to improve call quality and to reduce a calculation amount.

DETAILED DESCRIPTION

Knowledge Underlying Present Disclosure

Figure 1:
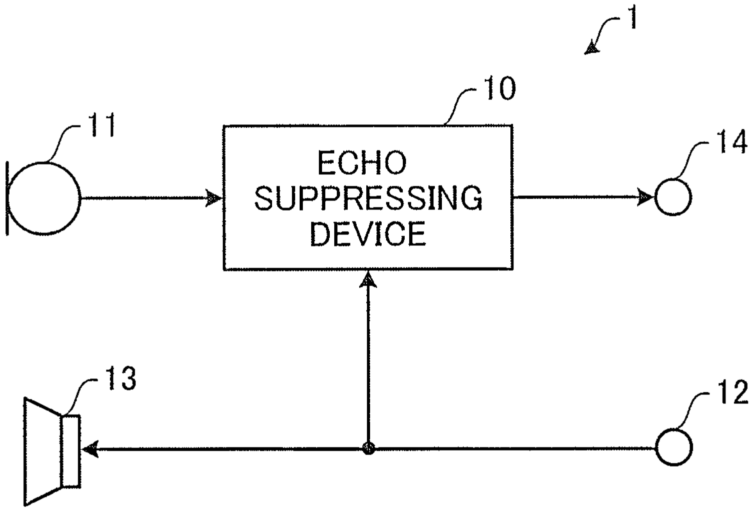
FIG. 1 is a diagram illustrating a configuration of a call device in a first embodiment of the present disclosure.

Conventionally, there exists an amplifying two-way call system using a microphone and a loudspeaker. In such an amplifying two-way call system, a voice spoken by a speaker on the transmitting side is input to a microphone on the transmitting side, transmitted as a transmission signal to a device on a receiving side via a communication line, and reproduced by a loudspeaker on the receiving side. The voice reproduced by the loudspeaker on the receiving side propagates through a space on the receiving side, is input to a microphone on the receiving side, and is transmitted to the transmitting side. At this time, from a loudspeaker on the transmitting side, voice uttered by the speaker himself or herself after elapse of time in which the voice passes through the communication line and time in which the voice propagates through the space on the receiving side is reproduced. Voice propagating from a loudspeaker on the receiving side to a microphone as described above is called an acoustic echo, which leads to deterioration of call quality.

For this reason, an echo suppressor that suppresses an acoustic echo is used in an amplifying two-way call system. In this echo suppressor, filter processing for suppressing an acoustic echo component is performed on input data in a frequency domain using discrete Fourier transform (DFT). However, due to filter processing in a frequency domain, there is a possibility that a phenomenon called aliasing distortion in which distortion of a latter half portion of input data turns back to a first half portion occurs. Occurrence of aliasing distortion leads to deterioration of call quality. For this reason, in order to reduce influence of aliasing distortion, a data length of input data is doubled by inserting a plurality of zeros having the same amount of data as the input data into the input data (zero padding). By the above, a plurality of pieces of zero data turn back as distortion, and influence of aliasing distortion on the input data is reduced.

However, in a case where a plurality of zeros are inserted into input data, it is possible to prevent deterioration of call quality, but since a data length of the input data handled by filter processing is doubled, an amount of calculation is also doubled, and increase in an amount of calculation becomes a problem. In particular, input data includes not only an input signal obtained from a microphone but also a reference signal used to suppress an interference sound included in the input signal. For this reason, a data length of each of the input signal and the reference signal is doubled.

In Patent Literature 1, at the time of conversion into a frequency domain, only calculation processing related to updated M samples is executed and a calculation result of a previous frame is copied and used for another piece of data, so that a calculation amount is reduced. In Patent Literature 2, a calculation amount is reduced by calculating an echo cancellation signal frequency component by using only an amplitude ratio between a collected sound signal frequency component and an estimated echo amplitude spectrum.

However, in Patent Literature 1 and Patent Literature 2, if processing of inserting a plurality of zeros is performed at the time of frequency domain conversion in order to reduce influence of aliasing distortion, there is a possibility that frequency resolution of the frequency domain conversion is doubled, and an amount of calculation is also doubled. For this reason, in a conventional technique, it is difficult to achieve both improvement of call quality and reduction of an amount of calculation.

In order to solve the above problem, a technique below is disclosed.

(1) An interference sound suppressing device according to one aspect of the present disclosure includes an input signal acquiring part that acquires an input signal obtained from a microphone, a reference signal acquiring part that acquires a reference signal, a data inserting part that increases an amount of data of the input signal to be larger than an amount of data of the reference signal by inserting a plurality of zeros into the input signal acquired, an interference sound suppressing part that suppresses an interference sound component included in the input signal by using the input signal having the amount of data increased and the reference signal acquired, a data deleting part that restores the amount of data of the input signal to an original amount by deleting the plurality of zeros inserted from the input signal in which the interference sound component is suppressed, and an output part that outputs the input signal having the amount of data restored.

According to this configuration, by inserting a plurality of zeros into an input signal, it is possible to reduce influence of aliasing distortion occurring when an interference sound component included in the input signal is suppressed, and to improve call quality. Further, since a plurality of zeros are inserted into only an input signal and a plurality of zeros are not inserted into a reference signal, an amount of calculation can be reduced as compared with a case where a plurality of zeros are inserted into both an input signal and a reference signal.

(2) In the interference sound suppressing device according to (1), the data inserting part may increase number of samples of the input signal to twice or more number of samples of the reference signal.

According to this configuration, since the number of samples of an input signal is increased to twice or more the number of samples of a reference signal, sufficient frequency resolution can be secured, and influence of aliasing distortion can be reliably reduced.

(3) In the interference sound suppressing device according to (1) or (2), the reference signal may be a reproduction signal output to a loudspeaker.

According to this configuration, since a reference signal is a reproduction signal output to a loudspeaker, an acoustic echo component included in the input signal can be suppressed.

(4) In the interference sound suppressing device according to (1) or (2), the reference signal may be a noise signal obtained from another microphone different from the microphone.

According to this configuration, since a reference signal is a noise signal obtained from another microphone different from the microphone, a noise component included in an input signal can be suppressed.

(5) In the interference sound suppressing device according to (1) or (2), the reference signal may be a noise signal from a predetermined direction obtained from the microphone.

According to this configuration, since a reference signal is a noise signal from a predetermined direction obtained from the microphone, a noise component included in an input signal can be suppressed.

(6) In the interference sound suppressing device according to any one of (1) to (5), the input signal acquiring part may acquire the input signal in a time domain, the reference signal acquiring part may acquire the reference signal in a time domain, and the interference sound suppressing part may include a first frequency domain conversion part that converts the input signal in the time domain having the amount of data increased into an input signal in a frequency domain, a second frequency domain conversion part that converts the reference signal in the time domain acquired into a reference signal in a frequency domain, a sample number reduction part that reduces number of samples of the input signal in the frequency domain converted to same number of samples as the reference signal, a coefficient calculation part that calculates a suppression coefficient for suppressing the interference sound component based on the input signal in the frequency domain with the number of samples reduced and the reference signal in the frequency domain converted, a sample number increasing part that increases number of samples of the suppression coefficient calculated to same number of samples as the input signal having the amount of data increased, a multiplication part that multiplies the input signal in the frequency domain converted by the suppression coefficient obtained by increasing the number of samples, and a time domain conversion part that converts the input signal in the frequency domain multiplied by the suppression coefficient into an input signal in the time domain.

According to this configuration, since the number of samples of an input signal in a frequency domain is reduced to the same number of samples as the reference signal, frequency resolution of the input signal and frequency resolution of the reference signal can be equalized when a suppression coefficient is calculated. Further, since the number of samples of a calculated suppression coefficient is increased to the same number of samples as an input signal whose amount of data is increased, frequency resolution of the suppression coefficient and frequency resolution of the input signal can be equalized.

(7) In the interference sound suppressing device according to any one of (1) to (6), the reference signal acquiring part may acquire a plurality of reference signals, and the interference sound suppressing part may suppress the interference sound component included in the input signal by using the input signal having the amount of data increased and the plurality of reference signals acquired.

According to this configuration, in a multichannel call system using a plurality of loudspeakers, a plurality of zeros are inserted only into an input signal, and a plurality of zeros are not inserted into a plurality of reference signals. Therefore, an amount of calculation can be greatly reduced as compared with a case where a plurality of zeros are inserted into all of an input signal and a plurality of reference signals.

Further, the present disclosure can be realized not only as an interference sound suppressing device having such a characteristic configuration as described above, but also as an interference sound suppressing method or the like of executing characteristic processing corresponding to the characteristic configuration provided in the interference sound suppressing device. The present disclosure can be realized also as a computer program that causes a computer to execute the characteristic processing included in such interference sound suppressing method. Accordingly, also in another aspect below, the same effect as that obtained by the above-described interference sound suppressing device can be achieved.

(8) An interference sound suppressing method according to another aspect of the present disclosure is an interference sound suppressing method in a computer, the interference sound suppressing method including acquiring an input signal obtained from a microphone, acquiring a reference signal, increasing an amount of data of the input signal to be larger than an amount of data of the reference signal by inserting a plurality of zeros into the input signal acquired, suppressing an interference sound component included in the input signal by using the input signal having the amount of data increased and the reference signal acquired, restoring the amount of data of the input signal to an original amount by deleting the plurality of zeros inserted from the input signal in which the interference sound component is suppressed, and outputting the input signal having the amount of data restored.

(9) An interference sound suppressing program according to another aspect of the present disclosure causes a computer to function as an input signal acquiring part that acquires an input signal obtained from a microphone, a reference signal acquiring part that acquires a reference signal, a data inserting part that increases an amount of data of the input signal to be larger than an amount of data of the reference signal by inserting a plurality of zeros into the input signal acquired, an interference sound suppressing part that suppresses an interference sound component included in the input signal by using the input signal having the amount of data increased and the reference signal acquired, a data deleting part that restores the amount of data of the input signal to an original amount by deleting the plurality of zeros inserted from the input signal in which the interference sound component is suppressed, and an output part that outputs the input signal having the amount of data restored.

(10) A non-transitory computer-readable recording medium according to another aspect of the present disclosure records an interference sound suppressing program, and the interference sound suppressing program causes a computer to function as an input signal acquiring part that acquires an input signal obtained from a microphone, a reference signal acquiring part that acquires a reference signal, a data inserting part that increases an amount of data of the input signal to be larger than an amount of data of the reference signal by inserting a plurality of zeros into the input signal acquired, an interference sound suppressing part that suppresses an interference sound component included in the input signal by using the input signal having the amount of data increased and the reference signal acquired, a data deleting part that restores the amount of data of the input signal to an original amount by deleting the plurality of zeros inserted from the input signal in which the interference sound component is suppressed, and an output part that outputs the input signal having the amount of data restored.

Hereinafter, an embodiment of the present disclosure will be described with reference to the accompanying drawings. Note that the embodiment below is an example of embodiment of the present disclosure, and is not intended to limit the technical scope of the present disclosure.

First Embodiment

FIG. 1 is a diagram illustrating a configuration of a call device 1 in the first embodiment of the present disclosure. The call device 1 is for use in an amplifying hands-free call system mounted on an automobile or the like, an amplifying two-way communication conference system, an interphone system, and the like.

The call device 1 illustrated in FIG. 1 includes an echo suppressing device 10, a microphone 11, an input terminal 12, a loudspeaker 13, and an output terminal 14.

The microphone 11 is arranged in a space where a transmitting-side speaker is present, and collects voice of the transmitting-side speaker. The microphone 11 outputs an input signal indicating collected voice to the echo suppressing device 10.

The input terminal 12 outputs a reproduction signal received from a call device (not illustrated) on the receiving side to the echo suppressing device 10 and the loudspeaker 13.

The loudspeaker 13 outputs input reproduction signal to the outside. Here, in a case where voice output from the loudspeaker 13 is collected by the microphone 11, voice uttered by a speaker on the receiving side is reproduced from a loudspeaker on the receiving side with a delay, and what is called an acoustic echo is generated. In view of the above, the echo suppressing device 10 suppresses an acoustic echo signal included in an input signal output from the microphone 11.

The output terminal 14 outputs an input signal in which an interference sound component (acoustic echo component) is suppressed by the echo suppressing device 10.

Note that the input terminal 12 and the output terminal 14 are connected to a communication part (not illustrated). The communication part transmits an input signal to a call device (not illustrated) on the receiving side via a network, and receives a reproduction signal from a call device (not illustrated) on the receiving side via a network. The network is the Internet, for example.

Figure 2:
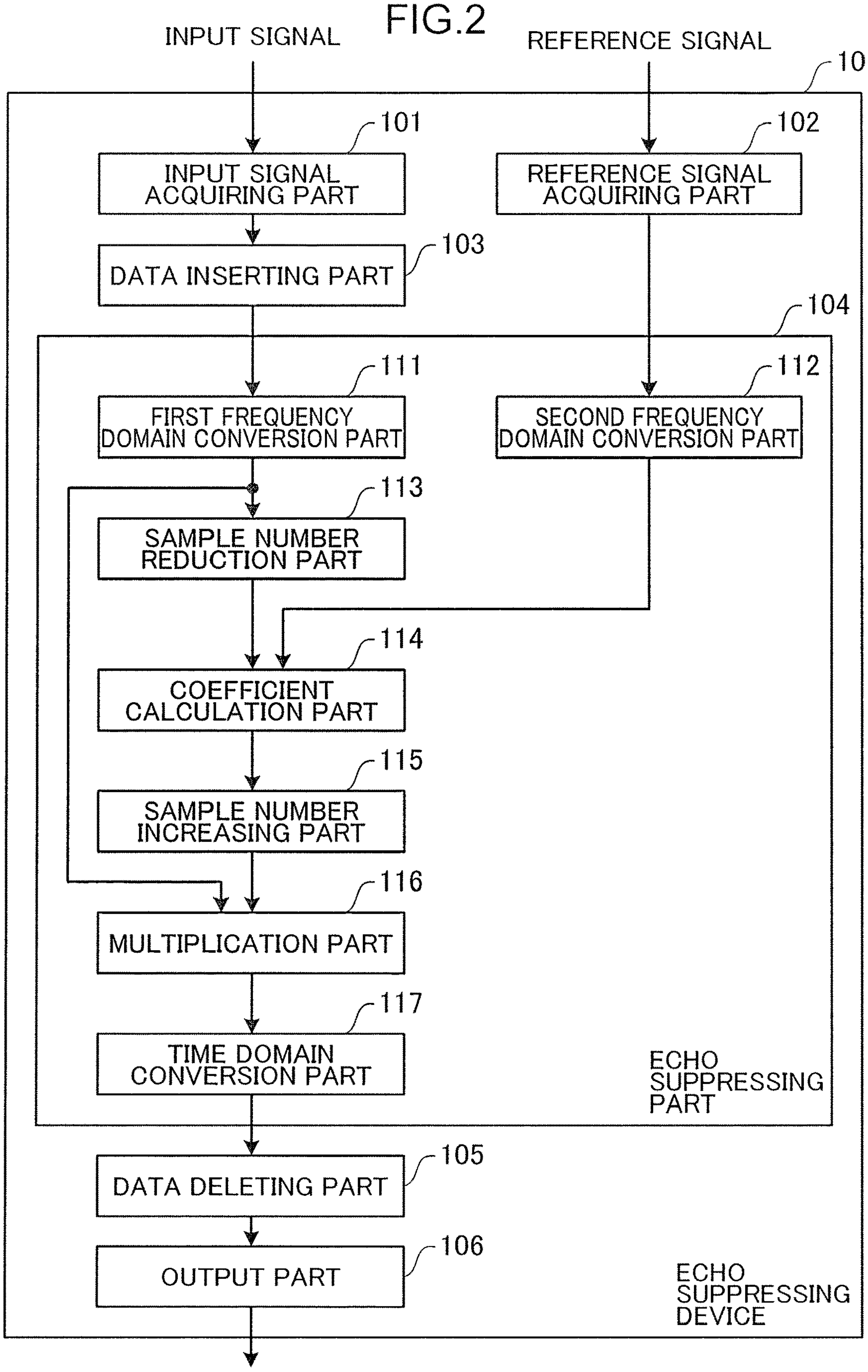
FIG. 2 is a diagram illustrating a configuration of an echo suppressing device according to the first embodiment of the present disclosure.

FIG. 2 is a diagram illustrating a configuration of the echo suppressing device 10 according to the first embodiment of the present disclosure. The echo suppressing device 10 is an example of an interference sound suppressing device.

The echo suppressing device 10 illustrated in FIG. 2 includes an input signal acquiring part 101, a reference signal acquiring part 102, a data inserting part 103, an echo suppressing part 104, a data deleting part 105, and an output part 106.

The input signal acquiring part 101 acquires an input signal in a time domain obtained from the microphone 11. The input signal acquiring part 101 acquires an input signal of a predetermined sample frequency and a predetermined number of samples. The predetermined sample frequency is, for example, 32 kHz, and the predetermined number of samples is, for example, 1024.

The reference signal acquiring part 102 acquires a reference signal in a time domain. The reference signal acquiring part 102 acquires a reproduction signal output to the loudspeaker 13 as a reference signal. The reference signal acquiring part 102 acquires a reference signal of a predetermined sample frequency and a predetermined number of samples. The predetermined sample frequency is, for example, 32 kHz, and the predetermined number of samples is, for example, 1024.

An amount of data (the number of samples) of an input signal acquired by the input signal acquiring part 101 is the same as an amount of data (the number of samples) of a reference signal acquired by the reference signal acquiring part 102.

The data inserting part 103 increases an amount of data of an input signal acquired by the input signal acquiring part 101 to be larger than an amount of data of a reference signal by inserting a plurality of zeros into the input signal. The data inserting part 103 increases the number of samples of an input signal to be larger than the number of samples of a reference signal. The data inserting part 103 increases the number of samples of an input signal to twice or more the number of samples of a reference signal.

For example, the data inserting part 103 inserts zeros as many as the number of samples of an input signal acquired by the input signal acquiring part 101, into the input signal. For example, in a case where the number of samples of an input signal acquired by the input signal acquiring part 101 is 1024, the data inserting part 103 inserts 1024 zeros into the input signal. By the above, an amount of data of an input signal becomes twice the original amount of data, and the number of samples of the input signal becomes 2048 which is twice the original number of samples.

Note that the data inserting part 103 may insert a plurality of zeros after an acquired input signal, or may insert a plurality of zeros before the acquired input signal. Further, the data inserting part 103 may divide an acquired input signal into two and insert a plurality of zeros between the two divided input signals. As described above, a position at which a plurality of zeros are inserted is not limited. Note that the data inserting part 103 stores an insertion position of a plurality of zeros in a memory (not illustrated).

Further, all of a plurality of zeros inserted into an input signal may be a value close to zero (substantially zero) such as 0.1, and some of a plurality of zeros inserted into an input signal may be a value close to zero (substantially zero) such as 0.1.

The echo suppressing part 104 is an example of an interference sound suppressing part. The echo suppressing part 104 uses an input signal whose amount of data is increased by the data inserting part 103 and a reference signal acquired by the reference signal acquiring part 102 to suppress an acoustic echo component (interference sound component) included in the input signal.

The echo suppressing part 104 includes a first frequency domain conversion part 111, a second frequency domain conversion part 112, a sample number reduction part 113, a coefficient calculation part 114, a sample number increasing part 115, a multiplication part 116, and a time domain conversion part 117.

The first frequency domain conversion part 111 converts an input signal in a time domain having an amount of data increased by the data inserting part 103 into an input signal in a frequency domain by fast Fourier transform (FFT) that performs discrete Fourier transform (DFT) at high speed.

The second frequency domain conversion part 112 converts a reference signal in a time domain acquired by the reference signal acquiring part 102 into a reference signal in a frequency domain by fast Fourier transform (FFT).

The sample number reduction part 113 reduces the number of samples of an input signal in a frequency domain converted by the first frequency domain conversion part 111 to the same number of samples as that of the reference signal. In a case where the number of samples of an input signal is 2048 and the number of samples of a reference signal is 1024, the sample number reduction part 113 reduces the number of samples of the input signal to 1024, which is a half. For example, the sample number reduction part 113 reduces the number of samples of the input signal by half by setting an average of values of two adjacent sample points of the input signal as a value of one sample point. By the above, an amount of data (the number of samples) of the input signal and an amount of data (the number of samples) of the reference signal become the same.

The coefficient calculation part 114 calculates a suppression coefficient for suppressing an acoustic error component (interference sound component) included in an input signal based on the input signal in a frequency domain obtained by reducing the number of samples by the sample number reduction part 113 and a reference signal in a frequency domain converted by the second frequency domain conversion part 112.

The coefficient calculation part 114 calculates an estimated value of a frequency characteristic of an acoustic coupling amount based on a ratio of power of an input signal to power of a reference signal. More specifically, the coefficient calculation part 114 calculates the smaller one of a ratio of power of an input signal to power of a reference signal and an estimated value of a frequency characteristic of an acoustic coupling amount one frame before as an estimated value of a frequency characteristic of an acoustic coupling amount. The coefficient calculation part 114 calculates a power estimation value of an acoustic echo by using power of a reference signal, an estimation value of an acoustic coupling amount, and a power estimation value of an acoustic echo one frame before. At this time, the coefficient calculation part 114 calculates a power estimation value of an acoustic echo by adding a value obtained by multiplying the power of the reference signal by the estimation value of the acoustic coupling amount and a value obtained by multiplying the power estimation value of the acoustic echo one frame before by a forgetting coefficient according to reverberation time.

The coefficient calculation part 114 calculates a suppression coefficient by using power of an input signal and a power estimation value of an acoustic echo based on the Wiener filter method. At this time, the coefficient calculation part 114 calculates a suppression coefficient by dividing a value obtained by subtracting the power estimation value of the acoustic echo from the power of the input signal by the power of the input signal. The suppression coefficient is a real value of 0 to 1, and a value of the suppression coefficient is small as the number of acoustic echo components included in an input signal is large, and a value of the suppression coefficient is large as the number of acoustic echo components included in an input signal is small.

The sample number increasing part 115 increases the number of samples of a suppression coefficient calculated by the coefficient calculation part 114 to the same number of samples as that of an input signal whose amount of data is increased by the data inserting part 103. In a case where the number of samples of a suppression coefficient is 1024 and the number of samples of an input signal is 2048, the sample number increasing part 115 increases the number of samples of the suppression coefficient to twice as many, which is 2048. For example, the sample number increasing part 115 doubles the number of samples of a suppression coefficient by setting a value of one sample point of a suppression coefficient to a value of two adjacent sample points. By the above, an amount of data (the number of samples) of the input signal and an amount of data (the number of samples) of the suppression coefficient become the same.

The multiplication part 116 multiplies an input signal in a frequency domain converted by the first frequency domain conversion part 111 by a suppression coefficient whose number of samples is increased by the sample number increasing part 115. The multiplication part 116 suppresses an acoustic echo component (interference sound component) included in an input signal by convoluting a suppression coefficient and the input signal. By the above, the input signal in which the acoustic echo component is suppressed is generated.

Note that aliasing distortion occurs when convolution operation of convolving a suppression coefficient and an input signal is performed. However, in the first embodiment, since a plurality of zeros are inserted into an input signal, it is possible to reduce influence of aliasing distortion generated when convolution operation is performed.

The time domain conversion part 117 converts an input signal in a frequency domain multiplied by a suppression coefficient by the multiplication part 116 into an input signal in a time domain by inverse fast Fourier transform (IFFT) that performs inverse discrete Fourier transform (IDFT) at high speed.

The data deleting part 105 restores an amount of data of an input signal to an original amount by deleting a plurality of zeros inserted by the data inserting part 103 from an input signal in which an acoustic echo component (interference sound component) is suppressed by the echo suppressing part 104. Note that a memory (not illustrated) stores an insertion position of a plurality of zeros inserted by the data inserting part 103. The data deleting part 105 refers to an insertion position of a plurality of zeros stored in a memory (not illustrated), and deletes a plurality of zeros inserted by the data inserting part 103 from an input signal in a time domain.

The output part 106 outputs an input signal whose amount of data is restored by the data deleting part 105 to the output terminal 14.

Next, operation of the echo suppressing device 10 according to the first embodiment of the present disclosure will be described.

Figure 3:
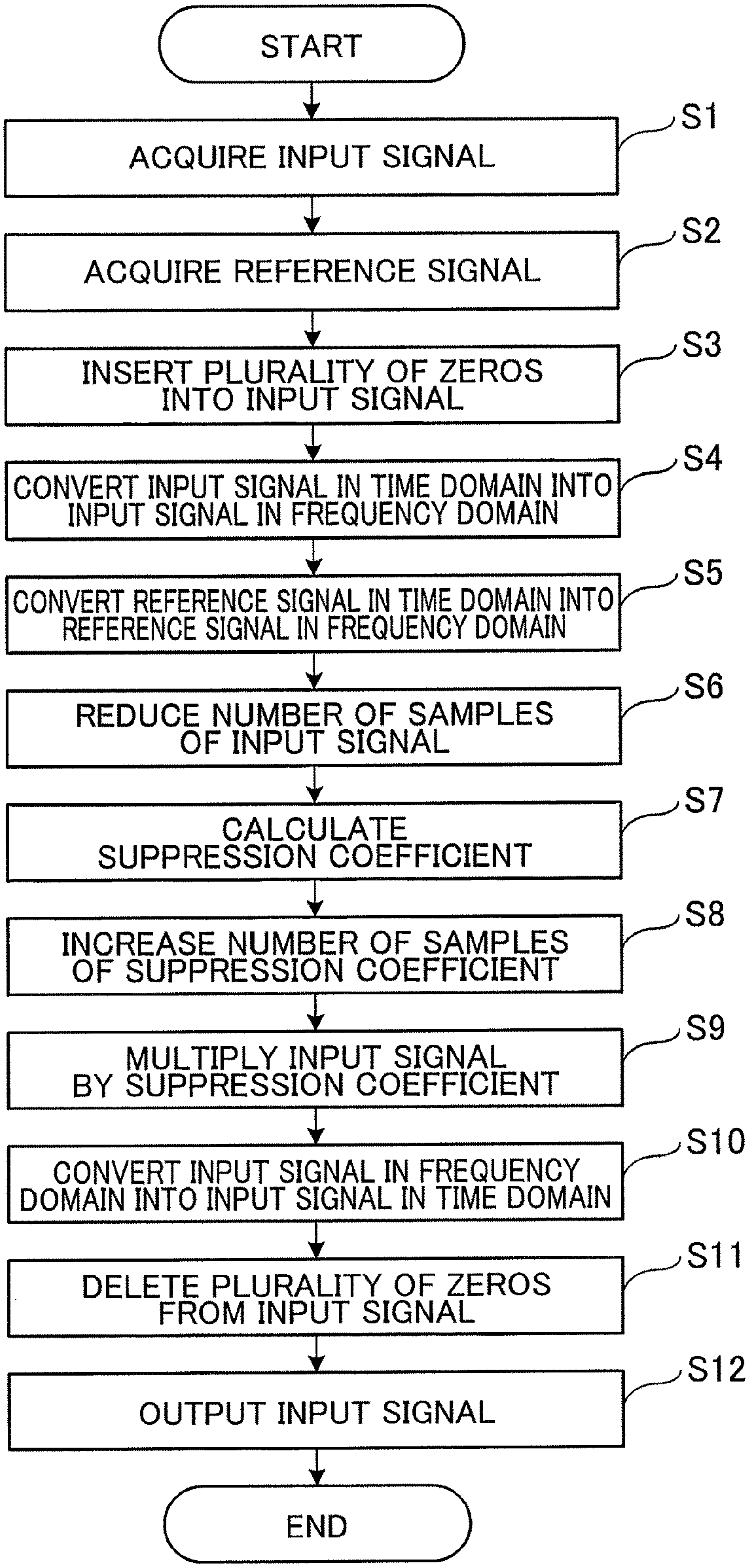
FIG. 3 is a flowchart for describing operation of the echo suppressing device according to the first embodiment of the present disclosure.

FIG. 3 is a flowchart for explaining operation of the echo suppressing device 10 in the first embodiment of the present disclosure.

First, in Step S1, the input signal acquiring part 101 acquires an input signal in a time domain obtained from the microphone 11.

Next, in Step S2, the reference signal acquiring part 102 acquires a reference signal in a time domain. The acquired reference signal is a reproduction signal output to the loudspeaker 13. Note that the number of samples of an input signal acquired by the input signal acquiring part 101 is the same as the number of samples of a reference signal acquired by the reference signal acquiring part 102.

Next, in Step S3, the data inserting part 103 inserts a plurality of zeros into the input signal acquired by the input signal acquiring part 101. At this time, the data inserting part 103 inserts zeros as many as the number of samples of the input signal acquired by the input signal acquiring part 101, into the input signal. By the above, the amount of data of the input signal becomes twice the amount of data of the reference signal.

Next, in Step S4, the first frequency domain conversion part 111 converts the input signal in a time domain having the amount of data increased by the data inserting part 103 into the input signal in a frequency domain. At this time, the first frequency domain conversion part 111 performs fast Fourier transform on the input signal in a time domain having the amount of data increased by the data inserting part 103. By the above, the input signal in a time domain is converted into the input signal in a frequency domain. The first frequency domain conversion part 111 outputs the converted input signal in a frequency domain to the sample number reduction part 113 and the multiplication part 116.

Next, in Step S5, the second frequency domain conversion part 112 converts the reference signal in a time domain acquired by the reference signal acquiring part 102 into the reference signal in a frequency domain. At this time, the second frequency domain conversion part 112 performs fast Fourier transform on the reference signal in a time domain acquired by the reference signal acquiring part 102. By the above, the reference signal in a time domain is converted into the reference signal in a frequency domain.

Next, in Step S6, the sample number reduction part 113 reduces the number of samples of the input signal in a frequency domain converted by the first frequency domain conversion part 111 to the same number of samples as that of the reference signal. For example, the sample number reduction part 113 sets the number of samples of the input signal in a frequency domain to ½. For example, the sample number reduction part 113 sets an average of values of two adjacent sample points of the input signal as a value of one sample point. By the above, an amount of data (the number of samples) of the input signal and an amount of data (the number of samples) of the reference signal become the same.

Next, in Step S7, the coefficient calculation part 114 calculates a suppression coefficient for suppressing an acoustic error component (interference sound component) included in the input signal based on the input signal in a frequency domain and the reference signal in a frequency domain. The suppression coefficient is, for example, a Wiener filter. For example, the coefficient calculation part 114 calculates the suppression coefficient from the input signal in a frequency domain and the reference signal in a frequency domain by using the Wiener filter method.

Next, in Step S8, the sample number increasing part 115 increases the number of samples of the suppression coefficient calculated by the coefficient calculation part 114 to the same number of samples as that of the input signal whose amount of data (number of samples) is increased. For example, the sample number increasing part 115 doubles the number of samples of the suppression coefficient calculated by the coefficient calculation part 114. For example, the sample number increasing part 115 sets a value of one sample point of the suppression coefficient as a value of two adjacent sample points. By the above, an amount of data (the number of samples) of the suppression coefficient becomes the same as an amount of data (the number of samples) of the input signal.

Next, in Step S9, the multiplication part 116 multiplies the input signal in a frequency domain converted by the first frequency domain conversion part 111 by the suppression coefficient whose number of samples is increased by the sample number increasing part 115.

Next, in Step S10, the time domain conversion part 117 converts the input signal in a frequency domain multiplied by the suppression coefficient by the multiplication part 116 into the input signal in a time domain. At this time, the time domain conversion part 117 performs inverse fast Fourier transform on the input signal in a frequency domain multiplied by the suppression coefficient by the multiplication part 116. By the above, the input signal in a frequency domain is converted into the input signal in a time domain.

Next, in Step S11, the data deleting part 105 deletes a plurality of zeros inserted by the data inserting part 103 from the input signal in a time domain in which an acoustic echo component (interference sound component) is suppressed, the input signal having been converted by the time domain conversion part 117. By the above, an amount of data of the input signal is restored to the original amount.

Next, in Step S12, the output part 106 outputs the input signal whose amount of data is restored by the data deleting part 105 to the output terminal 14.

In the above manner, by inserting a plurality of zeros into an input signal, it is possible to reduce influence of aliasing distortion occurring when an acoustic error component (interference sound component) included in the input signal is suppressed, and to improve call quality. Further, since a plurality of zeros are inserted into only an input signal and a plurality of zeros are not inserted into a reference signal, an amount of calculation can be reduced as compared with a case where a plurality of zeros are inserted into both an input signal and a reference signal.

Note that, in the first embodiment, the call device 1 includes one loudspeaker 13 and one output terminal 14, but the present disclosure is not particularly limited to this, and the call device 1 may include a plurality of loudspeakers 13 and a plurality of output terminals 14.

In this case, the reference signal acquiring part 102 may acquire a plurality of reference signals. The reference signal acquiring part 102 may acquire a plurality of reproduction signals output to the plurality of loudspeakers 13 as a plurality of reference signals in a time domain. The echo suppressing part 104 may use an input signal whose amount of data is increased by the data inserting part 103 and a plurality of reference signals acquired by the reference signal acquiring part 102 to suppress an acoustic echo component (interference sound component) included in the input signal. The second frequency domain conversion part 112 may convert a plurality of reference signals in a time domain acquired by the reference signal acquiring part 102 into a plurality of reference signals in a frequency domain by fast Fourier transform (FFT). The coefficient calculation part 114 may calculate a power estimation value of a plurality of acoustic echoes corresponding to a plurality of reference signals, and calculate a suppression coefficient by using power of an input signal and the power estimation value of a plurality of acoustic echoes.

Further, in the first embodiment, the call device 1 includes one microphone 11 and one input terminal 12, but the present disclosure is not particularly limited to this, and the call device 1 may include a plurality of microphones 11 and a plurality of input terminals 12. In this case, the call device 1 includes a plurality of echo suppressing devices 10 according to the number of the plurality of microphones 11 and the plurality of input terminals 12.

Second Embodiment

In view of the above, the echo suppressing device 10 in the first embodiment suppresses an acoustic echo signal included in an input signal output from the microphone 11. On the other hand, a noise suppressing device according to a second embodiment suppresses noise included in an input signal output from the microphone 11.

Figure 4:
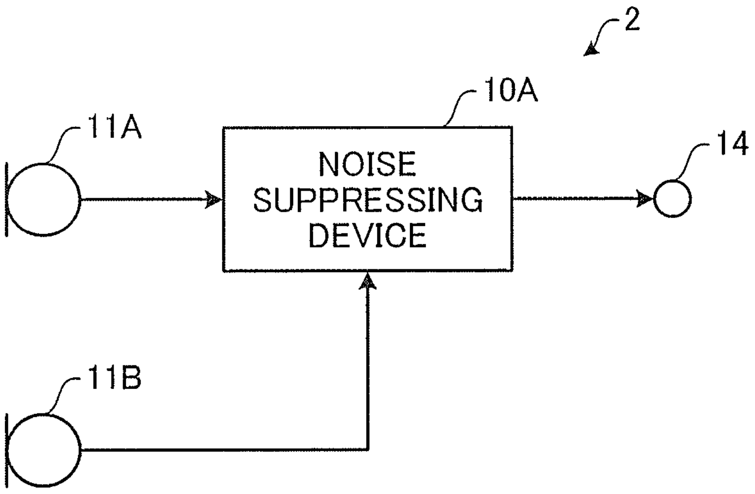
FIG. 4 is a diagram illustrating a configuration of a voice processing device according to a second embodiment of the present disclosure.

FIG. 4 is a diagram illustrating a configuration of a voice processing device 2 according to the second embodiment of the present disclosure. Note that the voice processing device 2 is used for a voice recognition system, a speaker identification system, and the like.

The voice processing device 2 illustrated in FIG. 4 includes a noise suppressing device 10A, a first microphone 11A, a second microphone 11B, and the output terminal 14.

The first microphone 11A is arranged in a space where a speaker is present, and collects voice of the speaker. The first microphone 11A outputs an input signal indicating the collected voice to the noise suppressing device 10A. The first microphone 11A has the same configuration as the microphone 11 in the first embodiment.

The second microphone 11B is arranged in a space where a transmitting-side speaker is present, and collects noise generated from a noise source existing around the transmitting-side speaker. The second microphone 11B outputs a noise signal indicating the collected noise as a reference signal to the noise suppressing device 10A.

In a case where a noise source exists around a speaker, voice collected by the first microphone 11A may include noise. In view of the above, the noise suppressing device 10A suppresses a noise signal included in an input signal output from first microphone 11A.

The output terminal 14 outputs an input signal in which an interference sound component (noise component) is suppressed by the noise suppressing device 10A.

Note that the output terminal 14 is connected to a voice recognition device or a speaker identification device. The voice recognition device recognizes voice of a speaker by using an input signal in which a noise component output from the output terminal 14 of the voice processing device 2 is suppressed. Further, the speaker identification device identifies a speaker by using an input signal in which a noise component output from the output terminal 14 of the voice processing device 2 is suppressed.

Figure 5:
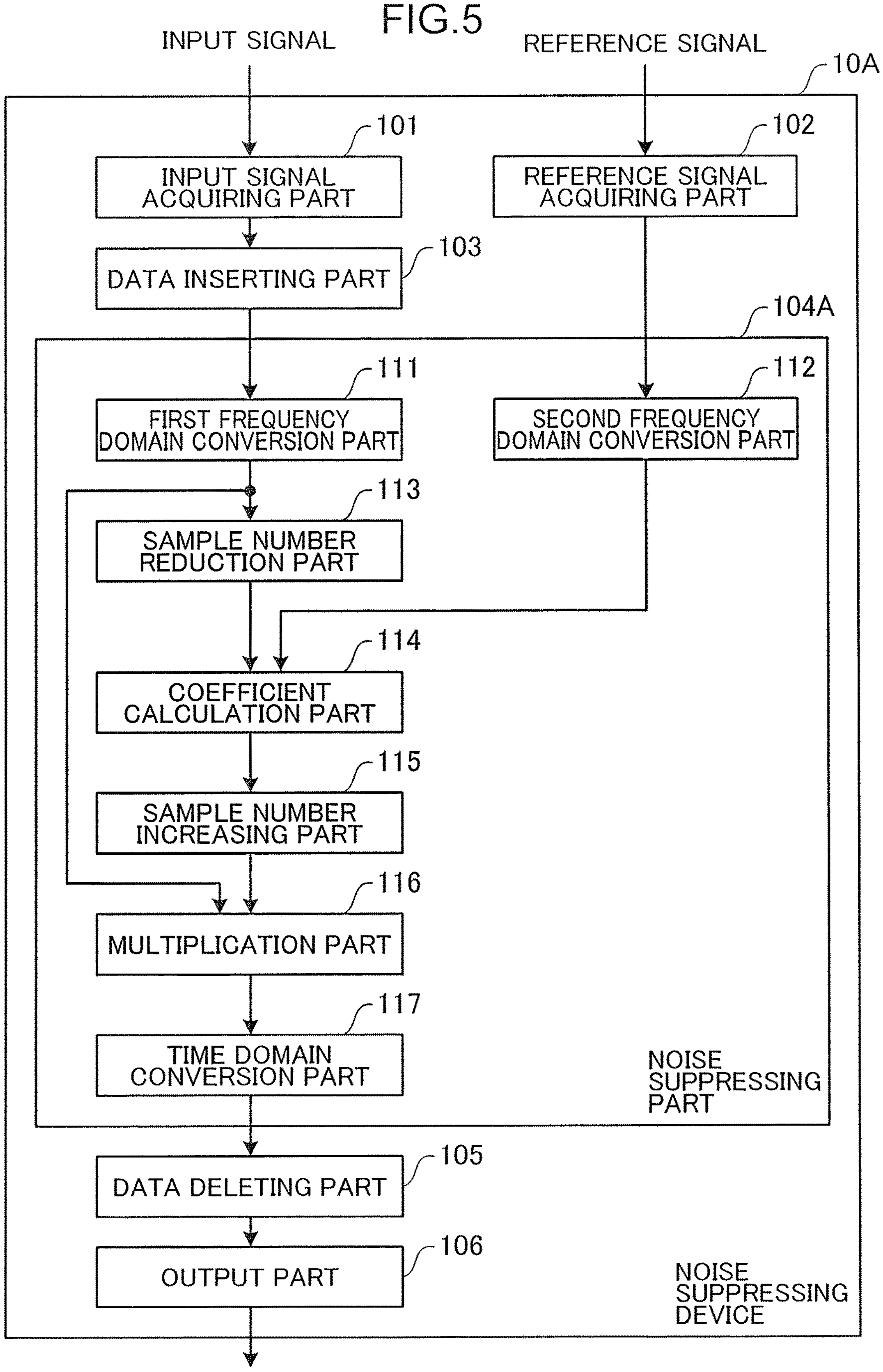
FIG. 5 is a diagram illustrating a configuration of a noise suppressing device according to the second embodiment of the present disclosure.

FIG. 5 is a diagram illustrating a configuration of the noise suppressing device 10A according to the second embodiment of the present disclosure. The noise suppressing device 10A is an example of an interference sound suppressing device.

The noise suppressing device 10A illustrated in FIG. 5 includes the input signal acquiring part 101, the reference signal acquiring part 102, the data inserting part 103, a noise suppressing part 104A, the data deleting part 105, and the output part 106. In the second embodiment, the same configuration as that in the first embodiment will be denoted by the same reference sign as that in the first embodiment, and will be omitted from description. In description below, a point different from the first embodiment will be described.

The input signal acquiring part 101 acquires an input signal in a time domain obtained from the first microphone 11A. The input signal acquiring part 101 acquires an input signal of a predetermined sample frequency and a predetermined number of samples. The predetermined sample frequency is, for example, 32 kHz, and the predetermined number of samples is, for example, 1024.

The reference signal acquiring part 102 acquires a reference signal in a time domain. The reference signal is a noise signal obtained from the second microphone 11B different from the first microphone 11A. The reference signal acquiring part 102 acquires a noise signal as a reference signal output from second microphone 11B. The reference signal acquiring part 102 acquires a reference signal of a predetermined sample frequency and a predetermined number of samples. The predetermined sample frequency is, for example, 32 kHz, and the predetermined number of samples is, for example, 1024.

The noise suppressing part 104A is an example of an interference sound suppressing part. The noise suppressing part 104A suppresses a noise component (interference sound component) included in an input signal by using an input signal whose amount of data is increased by the data inserting part 103 and a reference signal acquired by the reference signal acquiring part 102.

The noise suppressing part 104A includes a first frequency domain conversion part 111, a second frequency domain conversion part 112, a sample number reduction part 113, a coefficient calculation part 114, a sample number increasing part 115, a multiplication part 116, and a time domain conversion part 117.

The coefficient calculation part 114 calculates a suppression coefficient for suppressing a noise component (interference sound component) included in an input signal based on an input signal in a frequency domain obtained by reducing the number of samples by the sample number reduction part 113 and a reference signal in a frequency domain converted by the second frequency domain conversion part 112. A method of calculating a suppression coefficient of the coefficient calculation part 114 in the second embodiment is the same as the method of calculating a suppression coefficient of the coefficient calculation part 114 in the first embodiment. The coefficient calculation part 114 in the second embodiment calculates a power estimation value of noise, and calculates a suppression coefficient by using power of an input signal and the power estimation value of noise based on the Wiener filter method.

The data deleting part 105 restores an amount of data of an input signal to an original amount by deleting a plurality of zeros inserted by the data inserting part 103 from an input signal in which a noise component (interference sound component) is suppressed by the noise suppressing part 104A.

Note that operation of the noise suppressing device 10A in the second embodiment is the same as operation of the echo suppressing device 10 in the first embodiment, and will be omitted from description.

As described above, since a reference signal is a noise signal obtained from the second microphone 11B different from the first microphone 11A, it is possible to suppress a noise component included in an input signal.

Note that, in a case where a direction in which voice of a speaker arrives and a direction in which noise arrives are known, pieces of voice can be separated by a beamforming technique. In view of the above, the voice processing device 2 may include the noise suppressing device 10A, a microphone array, the second microphone 11B, the output terminal 14, and a beamformer. The microphone array includes a plurality of microphones. The microphone array outputs a collected sound signal to the beamformer. In a case where a first direction in which the voice of a speaker arrives and a second direction in which noise arrives are known, the beamformer may separate a voice signal from the microphone array into a first voice signal arriving from the first direction and a second voice signal arriving from the second direction. Then, the beamformer may output the first sound signal as an input signal to the noise suppressing device 10A and output the second sound signal as a reference signal to the noise suppressing device 10A. The input signal acquiring part 101 may acquire an input signal obtained from the microphone array. The reference signal acquiring part 102 may acquire a noise signal from a predetermined direction obtained from the microphone array as a reference signal.

Note that in each of the above embodiments, each constituent element may be realized by being configured with dedicated hardware or by execution of a software program suitable for each constituent element. Each constituent element may be realized by a program execution part, such as a CPU or a processor, reading and executing a software program recorded in a recording medium such as a hard disk or a semiconductor memory. Further, the program may be carried out by another independent computer system by being recorded in a recording medium and transferred or by being transferred via a network.

Some or all functions of the device according to the embodiment of the present disclosure are implemented as large scale integration (LSI), which is typically an integrated circuit. These functions may be individually integrated into one chip, or may be integrated into one chip so as to include some or all functions. Further, circuit integration is not limited to LSI, and may be implemented by a dedicated circuit or a general-purpose processor. A field programmable gate array (FPGA), which can be programmed after manufacturing of LSI, or a reconfigurable processor in which connection and setting of circuit cells inside LSI can be reconfigured may be used.

Some or all functions of the device according to the embodiment of the present disclosure may be realized by a processor such as a CPU executing a program.

Further, all numbers used above are illustrated to specifically describe the present disclosure, and the present disclosure is not limited to the illustrated numbers.

Further, order in which steps illustrated in the above flowchart are executed is for specifically describing the present disclosure, and may be any order other than the above order as long as a similar effect is obtained. Further, some of the above steps may be executed simultaneously (in parallel) with other steps.

The technique according to the present disclosure can improve call quality and reduce a calculation amount, and therefore is useful as a technique for suppressing an interference sound included in an input signal obtained from a microphone.

The invention claimed is:

1. An interference sound suppressing device comprising:

an input signal acquiring part that acquires an input signal obtained from a microphone;

a reference signal acquiring part that acquires a reference signal;

a data inserting part that increases an amount of data of the input signal to be larger than an amount of data of the reference signal by inserting a plurality of zeros into the input signal acquired;

an interference sound suppressing part that suppresses an interference sound component included in the input signal by using the input signal having the amount of data increased and the reference signal acquired;

a data deleting part that restores the amount of data of the input signal to an original amount by deleting the plurality of zeros inserted from the input signal in which the interference sound component is suppressed; and an output part that outputs the input signal having the amount of data restored.

2. The interference sound suppressing device according to claim 1, wherein the data inserting part increases number of samples of the input signal to twice or more number of samples of the reference signal.

3. The interference sound suppressing device according to claim 1, wherein the reference signal is a reproduction signal output to a loudspeaker.

4. The interference sound suppressing device according to claim 1, wherein the reference signal is a noise signal obtained from another microphone different from the microphone.

5. The interference sound suppressing device according to claim 1, wherein the reference signal is a noise signal from a predetermined direction obtained from the microphone.

6. The interference sound suppressing device according to claim 1, wherein the input signal acquiring part acquires the input signal in a time domain, the reference signal acquiring part acquires the reference signal in a time domain, and the interference sound suppressing part includes:

a first frequency domain conversion part that converts the input signal in the time domain having the amount of data increased into an input signal in a frequency domain;

a second frequency domain conversion part that converts the reference signal in the time domain acquired into a reference signal in a frequency domain;

a sample number reduction part that reduces number of samples of the input signal in the frequency domain converted to same number of samples as the reference signal;

a coefficient calculation part that calculates a suppression coefficient for suppressing the interference sound component based on the input signal in the frequency domain with the number of samples reduced and the reference signal in the frequency domain converted;

a sample number increasing part that increases number of samples of the suppression coefficient calculated to same number of samples as the input signal having the amount of data increased;

a multiplication part that multiplies the input signal in the frequency domain converted by the suppression coefficient obtained by increasing the number of samples; and a time domain conversion part that converts the input signal in the frequency domain multiplied by the suppression coefficient into an input signal in the time domain.

7. The interference sound suppressing device according to claim 1, wherein the reference signal acquiring part acquires a plurality of reference signals, and the interference sound suppressing part suppresses the interference sound component included in the input signal by using the input signal having the amount of data increased and the plurality of reference signals acquired.

8. An interference sound suppressing method in a computer, the interference sound suppressing method comprising:

acquiring an input signal obtained from a microphone;

acquiring a reference signal;

increasing an amount of data of the input signal to be larger than an amount of data of the reference signal by inserting a plurality of zeros into the input signal acquired;

suppressing an interference sound component included in the input signal by using the input signal having the amount of data increased and the reference signal acquired;

restoring the amount of data of the input signal to an original amount by deleting the plurality of zeros inserted from the input signal in which the interference sound component is suppressed; and outputting the input signal having the amount of data restored.

9. A non-transitory computer readable recording medium storing an interference sound suppressing program that causes a computer to function as:

an input signal acquiring part that acquires an input signal obtained from a microphone;

a reference signal acquiring part that acquires a reference signal;

a data inserting part that increases an amount of data of the input signal to be larger than an amount of data of the reference signal by inserting a plurality of zeros into the input signal acquired;

an interference sound suppressing part that suppresses an interference sound component included in the input signal by using the input signal having the amount of data increased and the reference signal acquired;

a data deleting part that restores the amount of data of the input signal to an original amount by deleting the plurality of zeros inserted from the input signal in which the interference sound component is suppressed; and an output part that outputs the input signal having the amount of data restored.

* * * * *